United States Patent [19]

Washecheck et al.

[11] 4,244,746

[45] Jan. 13, 1981

[54] SINGLE PACKAGE ADDITIVE FOR THERMOPLASTIC FORMULATION

[75] Inventors: Paul H. Washecheck; Ron G. Hale, both of Ponca City, Okla.

[73] Assignee: Conoco, Inc., Ponca City, Okla.

[21] Appl. No.: 57,785

[22] Filed: Jul. 16, 1979

[51] Int. Cl.³ .................. C08L 91/00; C08L 91/06
[52] U.S. Cl. ................ 106/268; 260/45.75 S; 260/28.5 R
[58] Field of Search ............ 260/429.7, 45.75 S; 106/268

[56] References Cited

U.S. PATENT DOCUMENTS

| | | | |
|---|---|---|---|
| 3,883,362 | 5/1975 | Yates et al. | 106/268 |
| 3,883,363 | 5/1975 | Yates et al. | 106/268 |
| 3,979,345 | 9/1976 | Yates et al. | 106/268 |
| 3,986,995 | 10/1976 | Yates et al. | 260/23 XA |
| 4,080,362 | 3/1978 | Hutton et al. | 260/429.7 |
| 4,080,363 | 3/1978 | Hutton et al. | 260/429.7 |
| 4,118,371 | 10/1978 | Kugele | 260/429.7 |

*Primary Examiner*—Theodore Morris
*Attorney, Agent, or Firm*—Cortlan R. Schupbach, Jr.

[57] ABSTRACT

A friable composition single additive package for thermoplastic extrusions is provided in the instant invention. The friable composition can contain paraffin waxes, calcium stearate, various pigments, fillers, lubricants, and stabilizers.

15 Claims, No Drawings

SINGLE PACKAGE ADDITIVE FOR THERMOPLASTIC FORMULATION

This invention relates to a process for preparing a friable composition from paraffinic hydrocarbon waxes, calcium hydroxide and certain fatty acids, or calcium salts of fatty acid, which are solid, glasslike, and remain friable under ambient conditions. These compositions contain a full range of thermoplastic formulation ingredients, including stabilizers. More specifically, this invention relates to compositions which, when placed in discrete particles, have a low tendency to fuse or coalesce compared to paraffinic hydrocarbon waxes and which are capable of being used as a single additive for extrusion aids in thermoplastic formulations. Such formulations become fluidized under elevated temperatures on the order of 90° C. or higher.

Thermoplastic extrusion formulations such as those containing polyvinyl chloride, commonly include paraffinic hydrocarbon waxes and calcium salts of some fatty acids, such as calcium stearate, as extrusion aids. These extrusion formulations are generally fed to an extruder as a mixture of particulate solids. It is desirable that any additives to the formulations, including the extrusion aids, be in a discrete, solid particulate form capable of being handled as solids. Unfortunately, the most economically satisfactory materials are also sticky or mushy.

This problem was partially solved in the prior art. U.S. Pat. Nos. 3,883,362; 3,883,363; 3,979,345; and 3,986,995 teach a method for producing a friable composition suitable for use as an extrusion aid in polymeric extrusion formulations by mixing a paraffinic hydrocarbon wax with calcium hydroxide and a fatty acid, or a calcium salt of a fatty acid, then heating to a temperature of at least 150° C. and thereafter cooling to recover a solid, glasslike, friable composition. These processes were a great advance in the art in that they allowed the use of mushy, low cost, paraffinic waxes instead of the more expensive microcrystalline waxes. Both types of wax produce excellent results when used in extrusion formulations, but paraffinic waxes were difficult to handle. The prior art thus overcame a major objection in allowing these materials to be handled in a solid, discrete free-flowing form with low tendency to agglomerate.

These four references are hereby incorporated by reference in their entirety.

In these references, it is taught that it is possible to incorporate other additives into the compositions when they are employed as extrusion aids or lubricants. These references state that other processing aids such as polyethylene waxes or acrylate polymers may be included. Also pigments such as titanium dioxide, fillers, and reinforcing materials can be included.

However, these materials did not include stabilizers, thus preventing the formation of a single package for friable composition additives for thermoplastic extrusions. Stabilizers, when incorporated using these processes prevented the product from attaining a friable form, leaving them soft, sticky and mushy instead.

It would therefore be of great benefit to provide a method for obtaining a single package of additives in friable, free-flowing form for thermoplastic extrusions. The package should contain various waxes, pigments, fillers, reinforcers and stabilizers, the sum of ingredients producing a finished product.

It is therefore an object of the instant invention to provide a single package friable composition free-flowing additives for thermoplastic extrusion. Other objects will become apparent to those skilled in this art as the description proceeds.

It has now been discovered according to the instant invention that a single package, free-flowing, friable composition for addition to thermoplastic formulations during extrusion can be prepared by a process comprising mixing a paraffinic hydrocarbon wax with calcium hydroxide and a fatty acid or a calcium salt of a fatty acid while heating to a temperature of at least 150° C., and while at this temperature inserting desired additive materials, including stabilizers and thereafter cooling to recover a solid, glasslike friable composition, said paraffinic hydrocarbon wax having a drop melting point of at least 43° C. and oil content of not greater than 50% by weight and a needle penetration value of 25° C. in the range of 1 millimeter to 20 millimeters, said fatty acid being a $C_{16}$ to $C_{24}$ aliphatic hydrocarbon, monocarboxylic acid or mixtures thereof and wherein the stabilizer has a structure selected from the group consisting of

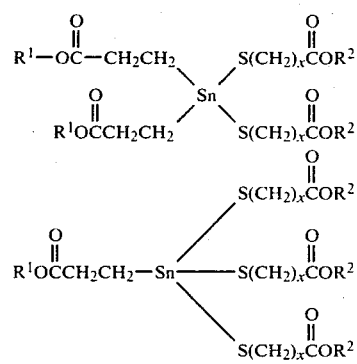

wherein $R^1$ is, independently, a saturated alkyl group containing from 1 to 10 carbon atoms, $R^2$ is, independently, a saturated or unsaturated alkyl group containing from 1 to 25 carbon atoms, and x is 1 to 5.

The stabilizers utilized in the instant invention are effective in forming a single package additive for thermoplastic formulation extrusions. Other stabilizers of the prior art have not been effective in these applications because the product obtained is soft and mushy. Such products are effective lubricants but cannot be easily stored and handled in conventional equipment.

The composition of the instant invention may be prepared by charging the calcium salt of a fatty acid or calcium hydroxide and fatty acid and paraffinic hydrocarbon wax to a heated vessel equipped with an agitator. The wax can be melted before charging to the vessel. Small amounts of water may be present as is known in the grease art. Under continued agitation, the ingredients are heated to at least 150° C., preferably at least about 160° C. to about 165° C. During this heatup time, the wax initially becomes molten, forming a continuous phase in which the calcium salt particles are dispersed. After assuming the continuous phase, a subsequent increase in viscosity is noticed until the mass reaches a homogeneous, paste-like consistency. As the temperature continues to rise, the paste-like mass breaks into separate phases; a low viscosity oil-like phase and a heavier paste-like phase. The heavier paste-like phase appears to then form soft bead-like masses and the low viscosity oil-like phase disappears into these masses. As the temperature continues to rise, the soft bead-like masses fuse and coalesce into a homogeneous taffy-like material. It is at this point that the final temperature of about 160° C. will be reached and the other additives necessary for the package can be added with agitation. Heating may be continued for a short period of time to insure completion of the transformation, even to higher temperatures just short of degradation temperature.

The hot mass, now containing fillers, pigments, and stabilizer is removed from the vessel and cooled to ambient conditions, whereupon the composition becomes a solid, glass-like friable material which can be ground or otherwise reduced into a particulate form. The particles formed will substantially retain their discreteness and integrity. The composition is a solid at ambient conditions and can be easily fractured or chopped. However, it is more convenient and somewhat easier to grind the composition under cryogenic conditions. However accomplished, the resultant particulate composition at ambient conditions can be easily handled with conventional solids handling equipment. The particulate composition, containing all additives necessary for thermoplastic formulation extrusion, will maintain its integrity upon standing or being stored.

It is emphasized at the outset that the composition prepared with the process of this invention is not a mere physical blend wherein each component contributes its individual properties without any interaction with each other. Rather, the physical form of the composition is unlike either of the individual components. The composition is best characterized as being a glass-like, friable solid at ambient conditions, resulting from a synergistic action between the paraffinic wax and calcium salt of a fatty acid or calcium hydroxide and a fatty acid. From a physical chemistry standpoint, it is not known what actually occurs in forming the composition.

Broadly, the process of the invention comprises mixing paraffinic hydrocarbon wax, calcium hydroxide and certain fatty acids while heating the mixture to at least about 150° C., preferably at least 160° C., adding desired formula material and the specific stabilizer disclosed herein, and thereafter cooling and recovering the solid, glass-like friable composition.

The fatty acids which may be employed are the $C_{16}-C_{24}$ aliphatic hydrocarbon monocarboxylic acids or mixtures thereof. These acids are preferably saturated. When mixtures of the acids are used, they may contain up to about 15 weight percent of a $C_{14}$ aliphatic hydrocarbon monocarboxylic acid of the same saturation characteristics outlined above. Illustrative of suitable acids are palmitic, stearic, oleic, linoleic, eicosanic, behenic, tall oil of fatty acid, hydrogenated vegetable fatty acid, hydrogenated tallow fatty acid, distilled cottonseed fatty acid, and the like. Various commercial grades of suitable acids are available, some of which are listed in *Fatty Acids and Their Industrial Applications* by E. S. Patterson, 1968, at Page 7, Table 1-2 (excluding high lauric). These suitable commercial acids are generally mixtures of the acids hereinbefore described and may additionally have small amounts of certain impurities depending on their method of manufacture.

The calcium hydroxide employed may be any commercial grade material such as slaked lime or hydrated lime.

The suitable paraffinic hydrocarbon waxes are generally derived from petroleum sources. These waxes contain a variety of hydrocarbon structures, for example normal paraffins, isoparaffins, cycloparaffins, small quantities of polycyclo-paraffins and aromatics and other hydrocarbons and may be in a purified form or may contain oils depending upon their source and/or manner of recovery. The paraffinic hydrocarbon waxes which are particularly useful are those having a drop melting point (ASTM D 127-63) of at least 110° F., preferably at least 145° F., an oil content (ASTM D 721-65T) of not greater than 50 weight percent, preferably not greater than 20 weight percent, and a needle penetration value at 77° F. (ASTM D 1321-65) in the range of 1 mm to 20 mm, preferably 1 mm to 10 mm.

More specifically, the process of the invention may be carried out by charging the paraffinic hydrocarbon wax, calcium hydroxide and fatty acid to a heated vessel equipped with an agitator. The wax may be premelted before being charged or it may be melted in the vessel. The fatty acid may be handled likewise as appropriate. The calcium hydroxide, being a solid, may be charged using any convenient solids handling means such as an auger.

Representative examples of thermoplastic formulations which contain these materials are polyvinylchloride extrusion formulations, polyethene extrusion formulations and acrylonitrile/butadiene styrene/formulations.

Representative examples of additives currently used in various thermoplastic formulations are set forth. It is emphasized that these additives are by no means exhaustive of those which can be utilized in the instant invention. However, it is essential to note that the stabilizers incorporated herein must be of a particular composition in order to obtain a friable product. Additives which can be incorporated into the friable compositions include paraffin wax as an external lubricant, calcium stearate as an internal lubricant, polyethylene as an external lubricant, titanium dioxide as pigments, calcium carbonates as fillers and impact modifiers, and stabilizers having the general formula

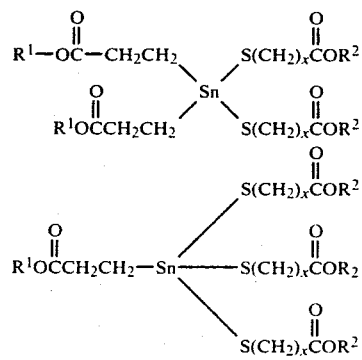

wherein $R^1$ is independently a saturated alkyl group containing from 1 to 10 carbon atoms, $R^2$ is independently a saturated or unsaturated alkyl group containing from 1 to 25 carbon atoms, and x is 1 to 5.

Representative but non-exhaustive examples of types of additives and examples of which are useful in the instant invention are:

External/Internal Lubricants

Paraffin wax
Polyethylene wax
Oxidized polyethylene wax
High molecular weight esters
Metal salts (Calcium stearate)

-continued

Pigments
Titanium Dioxide
Carbon Black
Fillers
Calcium Carbonate
Gypsum (Calcium sulfate)
Talc
Silica
Processing Aids
Methacrylate polymers
Styrene copolymers The instant invention is more concretely described with reference to the examples below wherein all parts and percentages are by weight unless otherwise specified. The examples are provided to illustrate the instant invention and not to limit it.

In all experiments set forth below, wax having the physical characteristics described was melted and lime was slurried. The reaction was held at 80° to 90° C. Stearic acid was added and the reaction process was agitated for 30 minutes. Heat was increased until the reaction mixture began to build up on the stir blade at about 160° to 165° C. Other ingredients were then added as listed. Examples 1 through 5 are comparative examples showing the use of some commercially available stabilizers. Example 1 shows a tin stabilizer alone as an additive. Example 2 shows a tin stabilizer with a filler. Example 3 shows the use of another tin stabilizer. Example 4 shows use of a different tin stabilizer. Example 5 shows the use of antimony stabilizer. Examples 6 and 7 show the stabilizers of the present invention in a single package, friable additive. The same paraffinic wax was used in all examples.

EXAMPLE 1

Using the general procedure described above, the following materials were charged to the reactor.

| Paraffin wax (Code 776) | 240g | (Trademark of and sold by Conoco Inc.) |
|---|---|---|
| Ca(OH)$_2$ | 24.6g | |
| Stearic acid | 150g | |
| Tin Stabilizer (TM 387) | 100g | (Trademark of and sold by Cincinatti-Milacron) |

The ingredients were added in the order listed. After the stabilizer was added to the product, the product became pastelike. After cooling, the product assumed the form of a soft, mushy material.

EXAMPLE 2

The following ingredients were charged to the reactor.

| Paraffin wax | 240g |
|---|---|
| Ca(OH)$_2$ | 25.9g |
| Stearic acid | 149g |
| CaCO$_3$ | 600g |
| Tin Stabilizer (TM 387) | 100g |

After the stabilizer was added, the product became sticky and remained so even after cooling to ambient conditions.

EXAMPLE 3

The following materials were added in the order indicated.

| Paraffinic wax | 270g | |
|---|---|---|
| Ca(OH)$_2$ | 25g | |
| Stearic acid | 150g | |
| Polyethylene | 30g | (AC-629-A, Trademark of and sold by Allied Chemical Co.) |
| TiO$_2$ | 200g | |
| CaCO$_3$ | 600g | |
| Tin Stabilizer | 80g | (Mark 1928, Trademark of and sold by Argus Chemical Co.) |

Upon addition of the final stabilizer, the product became a sticky glue. Upon cooling the product attained a paste-like, solid consistency. The product was not friable.

EXAMPLE 4

The following materials were added in the order set forth.

| Paraffinic wax | 135g |
|---|---|
| Ca(OH)$_2$ | 12.5g |
| Stearic acid | 75g |
| Polyethylene (AC-629-A) | 15g |
| TiO$_2$ | 100g |
| CaCO$_3$ | 300g |
| Tin Stabilizer (Mark 1928) | 39g |

Upon addition of the final stabilizers, the product became sticky and stringy. No friable composition could be formed.

EXAMPLE 5

The following materials were added in the order described.

| Paraffinic wax | 270g | |
|---|---|---|
| Ca(OH)$_2$ | 25g | |
| Stearic acid | 150g | |
| Polyethylene (AC-629-A) | 30g | |
| TiO$_2$ | 200g | |
| CaCO$_3$ | 600g | |
| Antimony Stabilizer (Synpron 1034) | 80g | (Trademark of and sold by Synthetic Products) |

Immediately upon addition of the stabilizer, the product became a sticky paste. The paste-like consistency remained when cooled. The product was not friable.

EXAMPLE 6

| Paraffinic wax | 135g | |
|---|---|---|
| Ca(OH)$_2$ | 15g | |
| Stearic acid | 75g | |
| Polyethylene (AC-629-A) | 15g | |
| TiO$_2$ | 100g | |
| CaCO$_3$ | 300g | |
| Tin Stabilizer (ET-250) | 30g | (Trademark of and sold by |

-continued

|  | Interstab Co.) |
|---|---|

The wax was melted and lime was added, followed by stearic acid. The mixture was heated with agitation until a taffy-like material balled up in the reactor. Polyethylene was then added followed by stabilizers, then $TiO_2$. Finally, $CaCO_3$ was added. The product balled after each addition. The product was not sticky and was easily removed from the reactor. The product was friable when cooled.

EXAMPLE 7

| Paraffinic wax | 135g |
|---|---|
| Ca(OH)$_2$ | 15g |
| Stearic acid | 75g |
| Polyethylene (AC-629-A) | 15g |
| TiO$_2$ | 100g |
| CaCO$_3$ | 300g |
| Tin Stabilizer (ET-250) | 40g |

The wax was melted and lime was added, followed by stearic acid. The mixture was heated with agitation until a taffy-like material balled up in the reactor. Polyethylene was then added followed by stabilizers, the $TiO_2$. Finally, $CaCO_3$ was added. The product balled after each addition. The product was not sticky and was easily removed from the reactor. The product was friable when cooled.

It is readily apparent from the data set forth that only stabilizers having a particular structure can be incapsulated into the friable compositions of the instant invention in order to provide a single additive package for thermoplastic formulations during extrusion. Representative examples of such additives are those having the following structure.

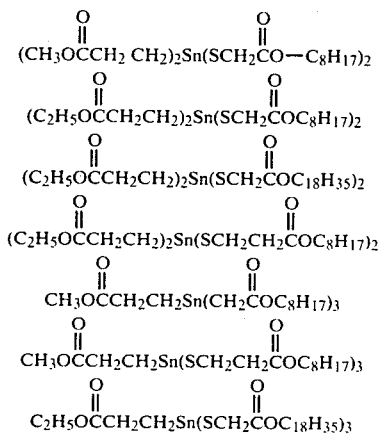

In the process of the instant invention, the materials must be heated to at least 150° C. in order to form friable compositions. However, temperatures of 160° C. are preferred. The process can be carried out when the fatty acid is mixed with a paraffinic hydrocarbon wax prior to adding the calcium hydroxide. However, the calcium hydroxide is preferably mixed with a paraffinic hydrocarbon wax prior to adding the fatty acid.

The mole ratio of calcium hydroxide to fatty acid ranges from about 0.5 to 1 respectively to about 1 to 1 respectively. However, the preferred range of mole ratios is from about 0.55 to 1 to about 0.65 to 1 respectively.

The weight ratio of wax to calcium salt of the fatty acid is normally in the range of from about 0.3 to 1 to about 2.5 to 1 respectively. However, the preferred weight ratio range of wax of fatty acid is from about 0.6 to 1 to about 1.7 to 1 respectively.

Paraffinic hydrocarbon wax of the instant invention should have a drop melting point of at least 43° C. but a drop melting point of about 60° C. is preferred. These waxes should have an oil content of not greater than 50 weight percent by weight but a oil content of not greater than 20 percent by weight is preferred. The needle penetration value at 25° C. will fall in the range of from 1 millimeter (mm) to 20 millimeters but a needle penetration value from 1 mm to 10 mm is preferred.

Likewise, the calcium salts which may be employed are those derived from $C_{16}$ to $C_{24}$ aliphatic hydrocarbon monocarboxylic acid and mixtures thereof. These acids can be saturated or unsaturated. The mixtures of the acids are used that can contain up to about 15 weight percent of the $C_{14}$ aliphatic hydrocarbon monocarboxylic acid of the same saturation characteristics set forth. Illustrative but non-exhaustive of suitable acids are palmitic, stearic, oleic linoleic, eicosanic, behenic, tall oil fatty acid, hydrogenated vegetable fatty acid, hydrogenated tallow fatty acid, distilled cottonseed fatty acid, and the like. Suitable commercial acids are generally mixtures of the acids described and may additionally have small amounts of certain impurities depending upon their methods of manufacture. Therefore, mixtures of fatty acids can easily be employed.

In addition, the process utilizing the mixture of fatty acids can contain up to about 15% by weight of a $C_{14}$ aliphaic hydrocarbon monocarboxylic acid.

No one stabilizer having the formula set forth need be used alone. Mixtures of these stabilizers can also be used as well as certain small amounts of other stabilizers, when said amounts are sufficiently low to allow the formation of a friable composition. However, such amounts are so minor as to be almost negligible.

While certain embodiments and details have been shown for the purpose of illustrating this invention, it will be apparent to those skilled in this art that various changes and modifications may be made herein without departing from the spirit or scope of the invention.

We claim:

1. A process for producing an improved friable composition for addition for thermoplastic formulations during extrusion comprising mixing a paraffinic hydrocarbon wax, calcium hydroxide, and a fatty acid or a calcium salt with a fatty acid while heating to a temperature of at least 150° C. thereafter adding a stabilizer and cooling to recover a solid glass-like friable composition, said paraffinic hydrocarbon wax having a drop melting point of at least 43° C., an oil content of not greater than 50 percent by weight and a needle penetration value (25° C.) in the range of 1 mm to 20 mm, said fatty acid being a $C_{16}$-$C_{24}$ aliphatic hydrocarbon monocarboxylic acid or mixtures thereof; said stabilizer having a structure selected from the group consisting of

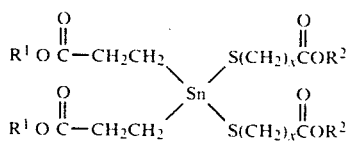

-continued

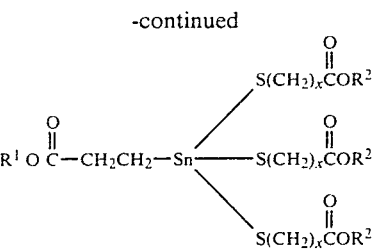

wherein $R^1$ is, independently, a saturated alkyl group containing from 1 to 10 carbon atoms, $R^2$ is independently a saturated or unsaturated alkyl group containing from 1 to 25 carbon atoms, and x is 1 to 5.

2. A process according to claim 1 wherein the mixture is heated to at least 160° C.

3. A process according to claim 1 wherein the fatty acid is mixed with the paraffinic hydrocarbon wax prior to adding the calcium hydroxide.

4. A process according to claim 1 wherein the calcium hydroxide is mixed with the paraffinic hydrocarbon wax prior to adding the fatty acid.

5. A process according to claim 1 wherein the mole ratio of calcium hydroxide to fatty acid is in the range of 0.5/1 to 1/1.

6. A process according to claim 5 wherein the mole ratio is 0.55/1 to 1/1.

7. A process according to claim 5 wherein the weight ratio of wax to calcium salt of the fatty acid is in the range of 0.3/1 to 2.5/1.

8. A process according to claim 6 wherein the weight ratio of wax to calcium salt of the fatty acid is 0.6/1 to 1.7/1.

9. A process according to claim 2 wherein the paraffinic hydrocarbon wax has a drop melting point of at least 60° C., an oil content of not greater than 20 weight percent and a needle penetration value at 25° C. in the range of 1 mm to 10 mm.

10. A process according to claim 9 wherein the fatty acid is palmitic acid, stearic acid, oleic acid, tall oil fatty acid, eicosanic acid, behenic acid, hydrogenated tallow fatty acid, hydrogenated vegetable oil, or mixtures thereof.

11. A process according to claim 1 wherein a mixture of fatty acids is employed.

12. A process according to claim 11 wherein the mixture of fatty acids contains up to 15 weight percent of $C_{14}$ aliphatic hydrocarbon monocarboxylic acid.

13. A process according to claim 12 wherein the stabilizer is selected from the group consisting of

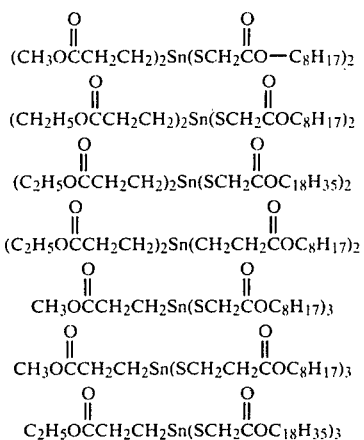

14. A process according to claim 12 wherein mixtures of stabilizers are used.

15. A process as described in claim 11 wherein further additives are incorporated into the friable composition, said additives selected from the group consisting of paraffin wax, polyethylene wax, oxidized polyethylene wax, high molecular weight esters, titanium dioxide, carbon black, calcium carbonate, calcium stearate, calcium sulfate, talc, silica, methacrylate polymers, or styrene copolymers.

* * * * *